United States Patent

Shimakura et al.

[11] Patent Number: 6,096,139
[45] Date of Patent: Aug. 1, 2000

[54] TRIAZINETHIOL-CONTAINING ANTICORROSIVE COATING, ANTICORROSION TREATMENT METHOD, AND ANTICORROSION TREATED METAL MATERIALS

[75] Inventors: Toshiaki Shimakura, Ichikawa; Yousuke Onodera, Kawasaki, both of Japan

[73] Assignee: Nippon Paint Co., Ltd., Osaka, Japan

[21] Appl. No.: 08/998,872

[22] Filed: Dec. 29, 1997

[30] Foreign Application Priority Data

Jan. 10, 1997 [JP] Japan .................................. 9-002557

[51] Int. Cl.⁷ .................................................. C23C 22/00
[52] U.S. Cl. ........................ 148/251; 148/260; 106/14.16; 106/14.42; 106/14.44
[58] Field of Search ..................... 148/251, 260, 148/274; 106/14.12, 14.16, 14.37, 14.42, 14.44; 252/301.25

[56] References Cited

U.S. PATENT DOCUMENTS

| | | | |
|---|---|---|---|
| 5,096,741 | 3/1992 | Kobayashi et al. | 427/127 |
| 5,112,404 | 5/1992 | Sommer et al. | 106/506 |
| 5,342,548 | 8/1994 | Yorke et al. | 106/14.12 |
| 5,360,492 | 11/1994 | Gray | 148/274 |
| 5,475,049 | 12/1995 | Ohtomo et al. | 524/449 |

FOREIGN PATENT DOCUMENTS

| | | |
|---|---|---|
| 53-31737 | 3/1978 | Japan . |
| 61-223062 | 10/1986 | Japan . |
| 3-131370 | 6/1991 | Japan . |
| 8-678634 | 3/1996 | Japan . |
| 8-239776 | 9/1996 | Japan . |
| 802276 | 10/1958 | United Kingdom . |
| WO97/22423 | 6/1997 | WIPO . |

*Primary Examiner*—John Sheehan
*Assistant Examiner*—Andrew L. Oltmans
*Attorney, Agent, or Firm*—Oliff & Berridge, PLC

[57] ABSTRACT

A solution and a process for non-chromium rust proof coating is disclose. The rust proof coating solution includes a composite of which the main components are an aqueous resin and water, with 0.2–20 g/l of triazine thiol compound and 0.1/5 g/l phosphoric acid contained therein. The rust proof process is a process for coating a zinc-coated steel or a non-coated steel with the rust proof coating solution as described above.

20 Claims, No Drawings

6,096,139

TRIAZINETHIOL-CONTAINING ANTICORROSIVE COATING, ANTICORROSION TREATMENT METHOD, AND ANTICORROSION TREATED METAL MATERIALS

BACKGROUND OF THE INVENTION

1. Field of the Invention

This invention relates to a triazinethiol-containing anticorrosive coatings, anticorrosion treatment method, and anticorrosion-treated metal material, and, more specifically, to a non-chromium anticorrosive coating with superior anticorrosion ability to that of known chromium-containing anticorrosion agents, to a corresponding anticorrosion treatment method, and to a corresponding anticorrosion-treated metal material.

2. Description of the Related Arts

When zinc coated steel plate or alloyed zinc coated steel plate are exposed to an atmosphere containing saline or brine, or are exposed to high temperature and high humidity, white rust forms on the surface. This white rust greatly damages both the outward appearance and the ability to prevent corrosion of the base iron surface.

To prevent white rust, chromium based anticorrosion agents are widely used. For example, Japanese Laid-open Publication No. Hei 3-131370 discloses a resin type treatment agent wherein a water dispersible chromium compound and water dispersible silica are incorporated in an olefin-α, β-ethylenic unsaturated carboxylic acid polymer resin dispersion.

However, even this type of chromium-containing resin type treatment agent does not necessarily have sufficient anticorrosion properties, and, if exposed to brine or to a high temperature and high humidity atmosphere for an extended time, white rust forms even when this treatment agent is used. Also, it has recently been understood that chromium is highly toxic, and consequently the use of chromium on equipment or in places where coated objects come in direct contact with workers has been limited.

The demand for non-chromium anticorrosion treatment agents has therefore been increasing, leading the inventors in the present application to find that sulfide ion reacts with zinc so as to form a stable ZnS coating, and their invention of a non-chromium anticorrosion treatment agent using sulfides and sulfur, as dislosed in Japanese Laid-open Publication No. Hei 8-239776 and Japanese Laid-open Publication No. Hei 8-67834.

However some sulfides emit a peculiar odor, and their handling is not always easy.

An anticorrosion treatment agent using a triazinethiol compound containing sulfur atoms, and without any foul odor or toxicity, has also been proposed. For example, the "water-soluble anticorrosion coating" of Japanese Laid-open Publication No. Sho 53-31737 discloses a water-soluble anticorrosion coating to which a dithiol-S-triazine derivative is added.

Also, the "metal-reactive emulsion" of Japanese Laid-open Publication No. Sho 61-223062 discloses a metal-reactive emulsion obtained by mixing a triazinethiol compound with an organic compound that is difficultly soluble or insoluble in water.

However the water-soluble anticorrosion coating disclosed in Japanese Laid-open Publication No. Sho 53-31737 is intended to prevent corrosion of soft steel, copper, brass, or copper wire, and is prepared in order to adsorb particularly well to a base material of copper or brass. This agent is therefore inadequate as an anticorrosion agent for zinc or other metal surfaces. Also, the reactive emulsion disclosed by Japanese Laid-open Publication No. Sho 61-223062 reacts with copper, nickel, tin, cobalt, aluminum, and their alloys, and was inadequate as an anti-corrosion agent for zinc and other metal surfaces.

SUMMARY OF THE INVENTION

This invention, which was conceived in view of the above problems, aims to provide a non-chromium type anticorrosive coating and anticorrosion treatment method having superior anticorrosion properties to those of chromium-containing anti-agents. It further provides a non-chromium corrosion-protected metal material having superior anticorrosion properties.

In order to achieve the aforesaid objectives, the anticorrosive coatings according to this invention comprises 0.2–20 g/l of a triazinethiol compound and 0.1–5 g/l of phosphoric acid ion contained in a composition comprising an aqueous resin and water as its principal components.

The anticorrosion treatment method according to this invention is a method of coating the aforesaid anticorrosion agent onto zinc coated steel or uncoated steel.

The anticorrosion-treated metal materials according to this invention are metal materials which have been coated with the aforesaid anticorrosive coatings.

Generally, in order for an anticorrosion treatment coating agent to be effective, it must possess the following properties:

(1) prevents permeation of corrosive liquids,
(2) forms an anticorrosive film which adsorbs strongly to the base metal,
(3) causes passivation of the base metal due to anticorrosion ions, and
(4) forms an anticorrosive film which is water-resistant, acid-resistant and alkali-resistant.

An agent that is inadequate in any of these properties does not have sufficient anticorrosion properties. Conventional chromium-type anticorrosion agents are superior as regards (3) passivation properties. In this context, the meaning of passivation is that a metal or alloy becomes inert, even when placed in an environment which is chemically or electrochemically active from a thermodynamic or chemical viewpoint.

In the same way as chromic acids, sulfides easily adsorb to metal surfaces, and, as they have excellent oxidizing power, they can also be used to render metal surfaces passive. Triazinethiol compounds, which are a type of sulfide, therefore have anticorrosion properties with respect to zinc coated metals.

When triazinethiol is added together with phosphoric acid ions ($PO_4^{3-}$) to an anticorrosive coatings comprising an aqueous resin, its anticorrosion properties increase remarkably, and an anticorrosive coatings superior to conventional chromium-containing resin anticorrosion agents is thereby obtained. This enhancement comes as a result of synergistic effects of the triazinethiol compound and phosphoric acid ion. The actual mechanism of these effects is thought to be as follows.

(1) thiol base ions in triazinethiol adsorb to active sites on a zinc surface when the anticorrosion agent is applied, and exhibit an anticorrosion effect. Triazinethiol cannot adsorb to inactive sites on the zinc surface (e.g. where oxide is present), however phosphoric acid ions react with these inactive sites forming zinc phosphate so that these sites become active. Triazinethiol then adsorbs to these activated sites also, thereby exhibiting an enhanced anticorrosion effect.

(2) The triazinethiol compound and phosphoric acid ion both act to promote cross-linking of the resin film.

As a result of these two synergistic effects, there are fewer micropores in the resin film, and water or harmful ions such as chlorine ion are effectively blocked.

This invention will next be described in more detail, with the triazinethiol-containing anticorrosive coatings according to this invention first being described. The triazinethiol compound has the following chemical structure:

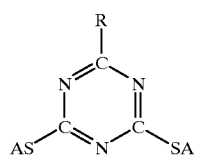

(I)

In the above general formula, R is —NR'$_2$, —NHR', or SA; R' is hydrogen or a lower alkyl group comprising 1–5 carbon atoms, phenyl, benzyl, naphthyl or cyclohexyl; the group may substitute any group of —OH, —COOH, or —NH$_2$; and A is sodium, potassium, hydrogen, or an amine group.

Typical triazinethiol compounds are 2,4,6-trimercapto-s-triazine, 2,4,6-trimercapto-s-triazine monosodium salt, 2,4,6-trimercapto-s-triazine trisodium salt, 2-dibutylamino-4,6-dimercapto-s-triazine, and 2-anilino-4,6-dimercapto-s-triazine. Of the above compounds, those which are not directly soluble in water were first dissolved in an alkaline solution, and then incorporated in the anticorrosive coatings.

Any aqueous resin may be used as the resin of this invention. Specific examples are polyolefin resins, polyurethane resins, acryl resins, polycarbonate resins, polyester resins, alkyd resins, phenol resins and other heat-curing resins. Resins capable of cross-linking are particularly preferred. The aforesaid aqueous resins may be blended in any desired proportion; two or more of the resins may also be blended together.

The anticorrosive coatings of the present invention comprises 1–80 weight parts of an aqueous resin (which may be a water-soluble resin or water-dispersible resin) expressed as solids, 99–20 weight parts of water, 0.2–20 g/l but more preferably 0.8–5 g/l of a triazinethiol compound relative to coating agent, and 0.1–5 g/l of phosphoric acid ion relative to coating agent. The pH is adjusted to be in the range 3–12. Herein, when the amount of triazinethiol compound is less than 0.2 g/l, anticorrosion properties are inadequate. Conversely, when the amount is greater than 20 g/l, not only is there no enhancement of anticorrosion properties so that there is no economic advantage, but also depending on the type of aqueous resin used, the resin may gelate so that coating is impossible.

Phosphoric acid ion forms a layer of phosphate on the surface of the base metal, passivates the metal and enhances cross-linking reactions of the aqueous resin in the resin film. Due to the fineness of the anticorrosion film which is thereby formed, anticorrosion properties are enhanced. When the amount of phosphoric acid ion is less than 0.1 g/l, corrosion protection is inadequate. When on the other hand this amount exceeds 5 g/l, anticorrosion properties decline, the resin gels, and the stability of the anticorrosive coatings in storage is poorer.

Anticorrosion additives may also be added to the anticorrosive coatings of this invention. One example of such an anticorrosion additive is water-dispersible silica.

When water-dispersible silica is added to the anticorrosive coatings of this invention, drying properties, anti-scratch properties and coating adhesion are improved. There is no particular limitation on the aforesaid water-dispersible silica provided that it does not contain sodium or other impurities, and provided that it is weakly alkaline. Examples include a commercial silica gel or commercial aerosol of powdered silica particles such as "Snowtex N" (Nissan Chemical Industries) or "Adelite AT-20N" (Asahi Electrochemical Industries). The amount of the aforesaid water-dispersible silicas is preferably in the range 2–600 g/l relative to anticorrosive coatings. When the amount of water-dispersible coating agent is less than 2 g/l, corrosion protection is inadequate, whereas when this amount exceeds 600 g/l, anticorrosion properties decline.

Additionally, the anticorrosive coatings according to the present invention may be blended with other components, such as, for example, a pigment or surfactant. Silane coupling agents may also be blended in order to improve affinity between the aqueous resin, and silica particles or pigment, and to improve adhesion between the aqueous resin and zinc or iron phosphate layer.

The aforesaid pigment may for example be an inorganic pigment such as titanium oxide (TiO$_2$), zinc oxide (ZnO), zirconium oxide (ZrO), calcium carbonate (CaCO$_3$), barium sulfate (BaSO$_4$), alumina (Al$_2$O$_3$), kaolin clay, carbon black, or iron oxide (Fe$_2$O$_3$, Fe$_3$O$_4$), or a coloring pigment, including organic pigments and the like.

The aforesaid silane coupling agent may, for example, be γ-aminopropyltrimethoxysilane, γ-aminopropyltriethoxysilane, γ-glycidoxypropyltrimethoxysilane, γ-methacryloxypropyltriethoxysilane, or N-[2-(vinylbenzylamino)ethyl]-3-aminopropyltrimethoxysilane.

A solvent may also be added to the anticorrosive coatings of this invention so as to improve the film-forming properties of the aqueous resin, and form a more uniform, smoother film. Any solvent generally used in paints may be used, including, for example, an alcohol, ketone, or ether.

According to this invention, the aforesaid anticorrosive coatings may be used as a treatment to protect zinc coated steel or uncoated steel from corrosion. In this treatment, the anticorrosion agent of the invention may be applied to an object to be coated, and the object may then be heated and dried in a current of warm air. Alternatively, the object to be coated may first be heated, the anticorrosion agent of this invention applied to the object while it is hot, and the surplus heat used to dry the object.

In either of the aforesaid methods, the heating temperature is 50–250° C. When the temperature falls below 50° C., the water evaporation rate is slow and adequate film-forming properties are not obtained, so corrosion protection is poor. Conversely, when the temperature exceeds 250° C., the aqueous resin thermally decomposes, salt-spray test (SST) performance and water resistance decline, and the surface color changes to yellow. The temperature must therefore lie within the above range, and more preferably within the range 70–100° C. When the object is heated and dried in a current of warm air after coating, the drying time is preferably 1 second–5 minutes.

In the aforesaid anticorrosion treatment, the coating thickness of the anticorrosion agent of this invention after drying is preferably equal to or greater than 0.1 μm. When it is less than 0.1 μm, corrosion protection is inadequate. Conversely when the dry film thickness is too thick, coating of the substrate is uneconomical and is also difficult to perform. The thickness therefore preferably lies in the range 1–20 µm, and more preferably in the range 0.1–10 µm.

However when the coating is used as an aqueous anticorrosion paint, the film thickness may be equal to 0.1 µm or more.

There is no particular limitation on the method used to apply the anticorrosive coatings of this invention in the aforesaid anticorrosion treatment. This may done by any of the methods generally used such as roll coat, air spray, airless spray or dipping.

The material coated by the anticorrosive coatings of this invention may be zinc coated steel or uncoated steel, as stated hereabove.

The anticorrosive coatings of this invention may be used as a paint undercoat and aqueous anticorrosion paint, as mentioned hereabove, or as a primary anticorrosive agent.

DESCRIPTION OF ACTUAL EXAMPLES

Next, this invention will be described more specifically by means of examples and comparative examples. However, it shall be understood that these examples are given to help illustrate and explain the invention, and are not intended to limit the invention in any way.

Examples 1–9 and Comparative Examples 1–5

(1) Test Method
a) SST Test (SST performance)

5% brine was sprayed on a coated surface at 35° C., and the extent of white rust was evaluated on a 10 point scale after 48 hours. The following point scale was used:
10 points: No abnormality
9 points: (Between 10 and 8)
8 points: Slight white rust
7–6 points: (Between 8 and 5)
5 points: White rust over half the surface area
4–2 points: (Between 5 and 1)
1 point: White rust over entire surface
b) Hot Water Test (humidity test)

The extent of white rust was evaluated on a 10 point scale after immersion in hot water at a constant temperature of 40° C. for 20 days. The following point scale was used:
10 points: No abnormality
9 points: (Between 10 and 8)
8 points: Slight swelling in coating film
7–6 points: (Between 8 and 5)
5 points: Swelling over half the surface area
4–2 points: (Between 5 and 1)
1 point: Swelling over entire surface (2) Anticorrosion Treatment Conditions

Example 1

2 g/l of 2,4,6-trimercapto-s-triazine and 1.25 g/l ammonium phosphate were dissolved in pure water, a polyolefin resin as described below) was added to give a 20% weight parts concentration expressed as resin solids, and 25 g/l of "Snowtex-N" (Nissan Chemical Industries) was added. The mixture was dispersed with stirring for 30 minutes in a Disper, and the pH was adjusted to 8.0 so as to obtain an anticorrosive coatings. The anticorrosive coatings obtained was coated by bar coater No. 5 onto a commercial hot dipp galvanized steel (Z-27, Japan Test Panel Inc., 70×150×1.6 mm) that had been preheated (i.e. heated before coating) to a plate temperature of 80° C., so that the dry coating film had a thickness of 2–3 µm. After the surface of the hot dipp galvanized steel was polished with Scotchbrite, it was alkali degreased ("Surfcleaner 53", Nippon Paint Co., Ltd.), washed with water, and dried. Evaluation as explained above was then performed. The evaluation results are shown in Table 1.

Example 2

The same procedure as that of Example 1 was followed, except that the addition concentration of the triazinethiol compound was 20 g/l, and the addition concentration of phosphate ion was 0.1 g/l. The test results are shown in Table 1.

Example 3

The same procedure as that of Example 1 was followed, except that the addition concentration of the triazinethiol compound was 0.2 g/l, and the addition concentration of phosphate ion was 5.0 g/l. The test results are shown in Table 1.

Examples 4–9

The same procedure as that of Example 1 was followed, except that the type of aqueous resin, type of triazinethiol compound, their concentrations, and the concentration of phosphoric acid ion, were varied. The test results are shown in Table 1.

Comparative Example 1

The same procedure as that of Example 1 was followed, except that 100 weight parts of the polyolefin resin in Example 1 below expressed as solids, 70 weight parts of "Snowtex N" expressed as solids and 5 weight parts of strontium chromate were blended together. The test results are shown in Table 1.

Comparative Examples 2–6

The same procedure as that of Example 1 was followed, except that the concentration of the triazinethiol compound and the addition concentration of phosphate ion were varied. The test results are shown in Table 1.

TABLE 1

COMPOSITION OF ANTICORROSIVE COATINGS

| | AQUEOUS RESIN (PROPORTION OF MIXED SOLIDS) | TRIAZINETHIOL COMPOUND NAME OF COMPOUND | (g/l) | PHOSPHORIC ACID ION (g/l) | SNOWTEX N (g/l) | TEST RESULTS STT PERFOMANCE | HUMIDITY RESISTANCE |
|---|---|---|---|---|---|---|---|
| EXAMPLES | | | | | | | |
| 1 | POLYOLEFIN RESIN | 2,4,6-TRIMERCAPTO-S-TRIAZINE | 2.0 | 1.25 | 25 | 10 | 10 |
| 2 | POLYOLEFIN RESIN | 2,4,6-TRIMERCAPTO-S-TRIAZINE | 20 | 0.1 | 25 | 10 | 9 |
| 3 | POLYOLEFIN RESIN | 2,4,6-TRIMERCAPTO-S-TRIAZINE | 0.2 | 5.0 | 25 | 9 | 10 |
| 4 | POLYOLEFIN RESIN/POLYURETHANE RESIN (1/1) | 2,4,6-TRIMERCAPTO-S-TRIAZINE | 2.0 | 1.25 | 25 | 10 | 10 |
| 5 | ACRYL RESIN/POLYURETHAN RESIN (1/1) | 2,4,6-TRIMERCAPTO-S-TRIAZINE MONOSODIUM SALT | 2.0 | 2.5 | 25 | 10 | 10 |
| 6 | EPOXY RESIN | 2,4,6-TRIMERCAPTO-S-TRIAZINE TRISODIUM SALT | 4.0 | 1.25 | 25 | 10 | 9 |
| 7 | EPOXY RESIN/ACRYL RESIN (1/1) | 2-ANILINO-4,6-DIMERCAPTO-S-TRIAZINE | 2.0 | 1.25 | 25 | 10 | 10 |
| 8 | POLYESTER RESIN/ACRYL RESIN/POLYURETHANE RESIN (1:1:1) | 2,4,6-TRINMERCAPTO-S-TRIAZINE | 2.0 | 1.25 | 25 | 10 | 10 |
| 9 | POLYOLEFIN RESIN/ACRYL RESIN (1/1) | 2-DIBUTYLAMINO-4,6-DIMERCAPTO-S-TRIAZINE | 4.0 | 1.25 | 25 | 9 | 9 |
| COMPARATIVE EXAMPLES | | | | | | | |
| 1 | ANTICORROSION AGENT CONTAING CHRAMATE AND RESIN | — | — | — | 140 | 6 | 5 |
| 2 | POLYOLEFIN RESIN | 2,4,6-TRIMERCAPTO-S-TRIAZINE | 0.1 | 1.25 | 25 | 5 | 5 |
| 3 | POLYOLEFIN RESIN | 2,4,6-TRIMERCAPTO-S-TRIAZINE | 25 | 1.25 | 25 | — | — |
| 4 | POLYOLEFIN RESIN | 2,4,6-TRIMERCAPTO-S-TRIAZINE | 2.0 | 0.05 | 25 | 6 | 5 |
| 5 | POLYOLEFIN RESIN | 2,4,6-TRIMERCAPTO-S-TRIAZINE | 2.0 | 10.0 | 25 | — | — |
| 6 | POLYOLEFIN RESIN | NO ADDITIVE | | 1.25 | 25 | 5 | 5 |

N.B.)
In comparative Examples 3 and 5, gelation occurred so that results could not be obtained.
Note)
Resins used
Polyolefin resin: "Hitech S-7024" (Toho Chemicals K.K.)
Polyurethane resin: "Bondtighter HUX-320" (Asahi Electrochemicals K.K.)
Alkyl resin: "EM1220" (Nippon Paint Co., Ltd.)
Epoxy resin: "Polysol 8500" (Showa Polymers K.K.)
Polyester resin: "Pesresin A-124G" (Takamatsu Oils and Fats K.K.)
"Snowtex N": Water-dispersible silica (Nissan Chemical Industries)

From these results, it was found that anticorrosion properties and corrosion protection were improved by the triazinethiol-containing anticorrosive coatings and anticorrosion treatment of this invention as compared to the conventional agents and methods.

As described above, according to the triazinethiol-containing anticorrosive coatings and anticorrosion treatment agent of this invention, by blending a triazinethiol and phosphoric acid ion which have low toxicity with an aqueous resin, superior anticorrosion properties to those of conventional chromate-containing aqueous resin anticorrosion agents are obtained. This invention therefore provides an environmentally safe, non-chromate anticorrosive coatings with excellent anticorrosion properties.

On materials coated with the triazinethiol-containing anticorrosive coatings according to this invention, a film having superior anticorrosion properties is formed, and corrosion is therefore suppressed.

What is claimed:

1. An anticorrosive coating composition comprising a composite of which main components are 1–80 weight parts expressed as solids of an aqueous resin and 99–20 weight parts of water, with 0.2–20 g/l of triazinethiol compound and 0.1–5 g/l phosphoric acid contained therein.

2. The anticorrosive coating composition as defined in claim 1, wherein said triazinethiol compound is at least one of 2,4,6-trimercapto-s-triazine, 2,4,6-trimercapto-s-triazine monosodium salt, 2,4,6-trimercapto-s-triazine trisodium salt, 2-dibutylamino-4,6-dimercapto-s-triazine, and 2-anilino-4,6-dimercapto-s-triazine.

3. The anticorrosive coating composition as defined in claim 1, wherein said aqueous resin source is one or more resin sources chosen from the group consisting of polyolefin resin, polyurethane resin, acryl resin, polycarbonate resin, polyester resin, alkyd resin, phenol resin, and heat-cured resin.

4. The anticorrosive coating composition as defined in claim 3, wherein said aqueous resin is blended in any desired proportion, or wherein said aqueous resin comprises two or more resins which are blended in any desired proportion.

5. The anticorrosive coating composition as defined in claim 1, wherein said anticorrosive coating comprises 1–80 weight parts aqueous resin expressed as solids, 99–20 weight parts of water, 0.8–5 g/l of said triazinethiol compound and 0.1–5 g/l phosphoric acid ion.

6. The anticorrosive coating composition as defined in claim 1, wherein the pH is adjusted to 3–12.

7. The anticorrosive coating composition as defined in claim 1, wherein an anticorrosion additive is added.

8. An anticorrosive coating composition comprising a composite of which main components are an aqueous resin and water, with 0.2–20 g/l of triazinethiol compound and 0.1–5 g/l phosphoric acid contained therein;
wherein an anticorrosion additive of water-dispersible silica is added.

9. The anticorrosive coating composition as defined in claim 8, wherein said water-dispersible silica is either commercial silica gel or alternatively, a commercial aerosol of powdered silica particles.

10. The anticorrosive coating composition as defined in claim 8, wherein the amount of said water-dispersible silica is 2–600 g/l relative to said anticorrosive coatings.

11. An anticorrosive coating composition as defined in claim 1, further comprising at least one of a pigment, surfactant, or silane coupling agent.

12. The anticorrosive coating composition as defined in claim 11, wherein said pigment is at least one inorganic pigment.

13. The anticorrosive coating composition as defined in claim 11, wherein said silane coupling agent is at least one of γ-aminopropyltrimethoxysilane, γ-aminopropyltriethoxysilane, γ-glycidoxypropyltrimethoxysilane, γ-methacryloxypropyltriethoxysilane, or N-[2-(vinylbenzylamino)ethyl]-3-aminopropyltrimethoxy-silane.

14. An anticorrosion treatment method whereby the anticorrosion coating composition of claim 1 is applied to a zinc-coated steel or a non-coated steel.

15. The anticorrosion treatment method as defined in claim 14, wherein said method is a method wherein said anticorrosive coating composition is applied to said steel and the resultant coated steel is then dried in a current of warm air; or a method wherein said steel is first heated, said anticorrosive coating composition is applied while said steel is hot, and said resultant coated steel is allowed to dry.

16. The anticorrosion treatment method as defined in claim 15, wherein the drying or heating temperature is in the range of 50–250° C.

17. An anticorrosion treatment method as defined in claim 14, wherein the dry film thickness is equal to or greater than 0.1 μm.

18. An anticorrosion treatment method as defined in claim 14, wherein the dry film thickness is in the range 0.1–20 μm.

19. An anticorrosion treatment method as defined in claim 14, wherein the dry film thickness is in the range 0.1–10 μm.

20. The anticorrosive coating as defined in claim 12, wherein said at least one inorganic pigment comprises titanium oxide ($TiO_2$), zinc oxide (ZnO), zirconium oxide (ZrO), calcium carbonate ($CaCO_3$), barium sulfate ($BaSO_4$), alumina ($Al_2O_3$), kaolin clay, carbon black, or iron oxide ($Fe_2O_3$, $Fe_3O_4$), or an organic coloring pigment.

* * * * *